(12) United States Patent
Seto

(10) Patent No.: US 7,453,904 B2
(45) Date of Patent: Nov. 18, 2008

(54) CUT-THROUGH COMMUNICATION PROTOCOL TRANSLATION BRIDGE

(75) Inventor: Pak-Lung Seto, Shrewsbury, MA (US)

(73) Assignee: Intel Corporation, Santa Clara, CA (US)

(*) Notice: Subject to any disclaimer, the term of this patent is extended or adjusted under 35 U.S.C. 154(b) by 738 days.

(21) Appl. No.: 10/977,070

(22) Filed: Oct. 29, 2004

(65) Prior Publication Data

US 2006/0095589 A1  May 4, 2006

(51) Int. Cl.
*H04J 3/16* (2006.01)
*H04J 3/22* (2006.01)

(52) U.S. Cl. .................................... 370/466
(58) Field of Classification Search ................ 370/464, 370/465, 466, 467, 401, 389, 470, 472, 473, 370/474, 476; 709/230, 236
See application file for complete search history.

(56) References Cited

U.S. PATENT DOCUMENTS

| | | | |
|---|---|---|---|
| 6,894,979 B1* | 5/2005 | Lee | 370/241 |
| 7,382,788 B2* | 6/2008 | Furey et al. | 370/401 |
| 2002/0087729 A1* | 7/2002 | Edgar | 709/246 |
| 2002/0110146 A1* | 8/2002 | Thayer et al. | 370/465 |
| 2003/0093541 A1* | 5/2003 | Lolayekar et al. | 709/230 |
| 2005/0120037 A1* | 6/2005 | Maruyama et al. | 707/100 |
| 2005/0135299 A1* | 6/2005 | Bishop et al. | 370/328 |
| 2005/0271058 A1* | 12/2005 | Atoji | 370/389 |
| 2006/0004935 A1 | 1/2006 | Seto et al. | |
| 2006/0095608 A1 | 5/2006 | Seto | |
| 2007/0242694 A1* | 10/2007 | Signaoff et al. | 370/466 |

OTHER PUBLICATIONS

PCI Express Base Specification Revision 1.0, Jul. 22, 2002, 15 pgs.
PCI-X Addendum to the PCI Local Bus Specification Revision 1.0a, Jul. 24, 2000 PCI Special Interest Group, 9 pgs.
Serial AT: High Speed Serialized AT Attachment: Revision 1.0a, Jan. 7, 2003, APT Technologies, Inc., Dell Computer Corporation, IBM Corporation, Intel Corporation, Maxtor Corporation, Seagate Corporation, 9 pgs.
Serial ATA II: Extensions to Serial ATA 1.0a Revision 1.2, Aug. 27, 2004, 4 pgs.
American National Standard, Working Draft Serial Attached SCSI—1.1 (SAS-1.1), Revision 6, 534 pgs., Oct. 2, 2004.
Satran, J., et al., Internet Small Computer Systems Interface (iSCSI), Network Working Group, Request for Comments: 3720, Category: Standards Track, 200 pgs., Apr. 2004.

(Continued)

*Primary Examiner*—Ajit G Patel
(74) *Attorney, Agent, or Firm*—Grossman, Tucker, Perreault & Pfleger PLLC

(57) ABSTRACT

A method according to one embodiment may include receiving a portion of an inbound frame compliant with a first communication protocol, translating the portion of the inbound frame into a translated portion compliant with a second communication protocol; and constructing an outbound frame comprising the translated portion before an entirety of the inbound frame is received. A cut-through communication protocol translation bridge may comprise an integrated circuit capable of performing such a method. Of course, many alternatives, variations, and modifications are possible without departing from these embodiments.

17 Claims, 7 Drawing Sheets

OTHER PUBLICATIONS

INCITS working draft proposed American National Standard for Information Technology, Fibre Channel—Framing and Signaling-2 (FC-FS-2) Rev 0.30, 442 pgs., Sep. 7, 2004.

American National Standard for Information Technology—Fibre Channel Arbitrated Loop (FC-AL-2) Amendment 1. 43 pages. Apr. 7, 2003.

* cited by examiner

CUT-THROUGH COMMUNICATION PROTOCOL TRANSLATION BRIDGE

FIELD

This disclosure relates to a cut-through communication protocol translation bridge.

BACKGROUND

A conventional data storage system may include one device capable of bidirectional communication with another device. One device may include a computer node having a host bus adapter (HBA). The other device may be a mass storage device. Each device such as the HBA and the mass storage device may only be capable of communicating using a single communication protocol. Therefore, if the transmitting and receiving devices are compatible with separate communication protocols, a communication protocol translation bridge may be necessary to convert information from one protocol to the next protocol to permit communication there between.

To accomplish such protocol conversion, a conventional bridge may utilize a store and forward type architecture. That is, the bridge may first accept an inbound IO (input/output) compliant with a first communication protocol and store the entire contents of the inbound IO in memory. The bridge may then assemble an outbound IO compliant with a second communication protocol and transmit such outbound IO. However, this store and forward type architecture has drawbacks. First, it requires significant memory resources to perform such operations. Second, it contributes to latency as an entire inbound IO must be received and stored before the associated outbound IO may be constructed and transmitted.

BRIEF DESCRIPTION OF THE DRAWINGS

Features and advantages of embodiments of the claimed subject matter will become apparent as the following Detailed Description proceeds, and upon reference to the Drawings, where like numerals depict like parts, and in which:

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
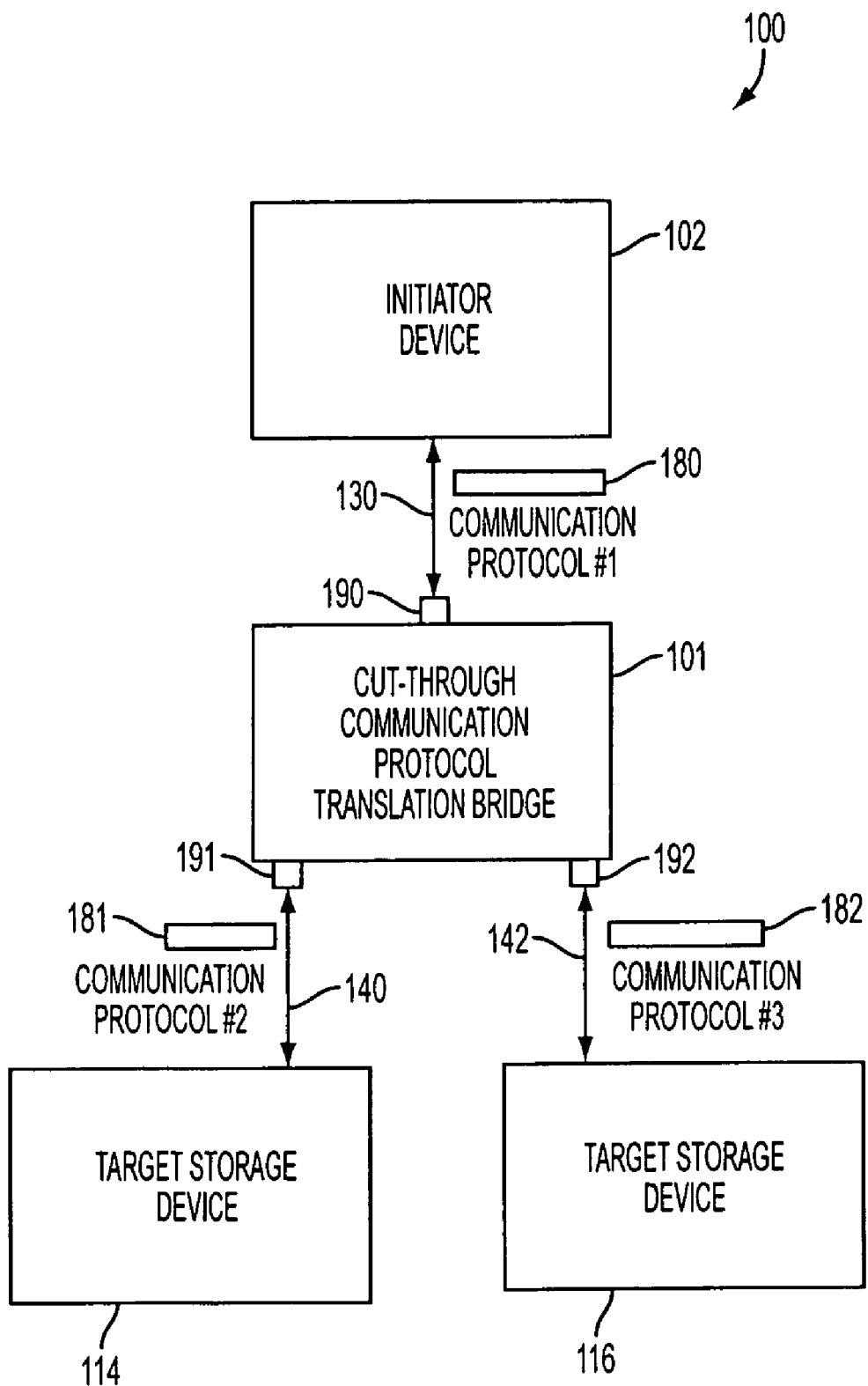
FIG. 1 is a diagram illustrating a system embodiment.

FIG. 1 illustrates a data storage system 100 including a cut-through communication protocol translation bridge 101 consistent with an embodiment. The cut-through communication protocol translation bridge 101 may have a port 190 for coupling to an initiator device 102 via an associated communication link 130 for bidirectional communication of data and/or commands there between. The cut-through communication protocol translation bridge 101 may also have ports 191, 192 for coupling to an associated plurality of target devices 114, 116 via associated communication links 140, 142 for bidirectional communication of data and/or command there between. Although only one initiator device 102 and two target storage devices 114, 116 are illustrated, the cut-through communication protocol translation bridge 101 may be utilized with fewer or more of such devices and other devices.

The initiator device 102 may be a variety of computer servers having a HBA. The target storage devices 114, 116 may comprise mass storage. The initiator device and target devices may act as both transmitting and receiving devices to transmit data and/or commands to each other. Each device may be capable of communicating utilizing a different communication protocol, and the cut-through communication protocol translation bridge 101 may facilitate communication between such devices 102, 114, 116 by translating data and/or commands compliant with one protocol into associated data and/or commands compliant with another communication protocol.

For instance, initiator device 102 may communicate data and/or commands compliant with a first communication protocol to the bridge 101, target device 114 may communicate data and/or commands compliant with a second communication protocol to the bridge 101, and target device 116 may communicate data and/or commands compliant with a third communication protocol to the bridge 101. Each communication protocol may parse data and/or commands into frames 180, 181, 182 compliant with each respective protocol. A "frame" as used herein may comprise one or more symbols and values. Only one frame 180, 181, 182 compliant with each respective communication protocol is illustrated for clarity, although a large number of such frames may be transmitted and received by the devices 102, 114, 116.

The communication protocols that the cut-through communication protocol translation bridge 101 may be capable of translating between may include, but are not limited to, Fibre Channel (FC), Serial Advanced Technology Attachment (S-ATA), Serial Attached Small Computer Systems Interface (SAS) protocol, and Internet Small Computer System Interface (iSCSI). The FC protocol may comply or be compatible with the interface/protocol described in ANSI Standard Fibre Channel Framing and Signaling Specification, 2 Rev 0.3 T11/1619-D, dated Sep. 7, 2004. The FC protocol may also comply or be compatible with the Fibre Channel Arbitrated Loop (FCAL) protocol described in ANSI INCITS 332:1999/AM1-2003. The S-ATA protocol may comply or be compatible with the protocol described in "Serial ATA: High Speed Serialized AT Attachment," Revision 1.0a, published on Jan. 7, 2003 by the Serial ATA Working Group, and the Extension to SATA, 1.0a Rev 1.2, dated Aug. 27, 2004. The SAS protocol may comply or be compatible with the protocol described in "Information Technology—Serial Attached SCSI—1.1 (SAS)," Working Draft American National Standard of International Committee For Information Technology Standards (INCITS) T10 Technical Committee, Project T10/1562-D, Revision 6, published Oct. 2, 2004, by American National Standards Institute (hereinafter termed the "SAS Standard") and/or later-published versions of the SAS Standard. Further, the iSCSI protocol may comply or be compatible with the protocol described in "IP Storage Working Group, Internet Draft, draft-itef-ips-iscsi-21.txt", published Apr. 29, 2004 by the Internet Engineering Task Force (IETF) and/or later published versions of the same.

The cut-through communication protocol translation bridge 101 may be used in a variety of systems. In one system, the bridge 101 may be utilized to facilitate an extension of a physical distance between an initiator and target device since some of the distances between the initiator and target devices using some communication protocols may be limited. The bridge 101 can thus enable an initiator device compliant with one communication protocol, e.g., FC, to have access to desired less expensive storage devices, e.g., SAS and S-ATA storage devices.

For example, the target storage devices 114, 116 may be compatible with SAS and S-ATA respectively. The cable length distance of the communication link 140 may be limited to approximately 10 meters for SAS while the cable length distance of the communication link 142 may be limited to approximately 1 meter for S-ATA. The cut-through communication protocol translation bridge 101 may be physically located within such proscribed distances from the target devices 114, 116. The initiator device 102 may be compatible with another communication protocol, e.g., FC, where maximum cable lengths are much greater than SAS or S-ATA. Hence, the cut-through communication protocol bridge 101 may enable an initiator device 102 compatible with FC to have efficient access to less expensive SAS and S-ATA storage devices 114, 116 despite cable lengths between the initiator and target devices longer than permissible using either SAS or S-ATA only.

Figure 2:
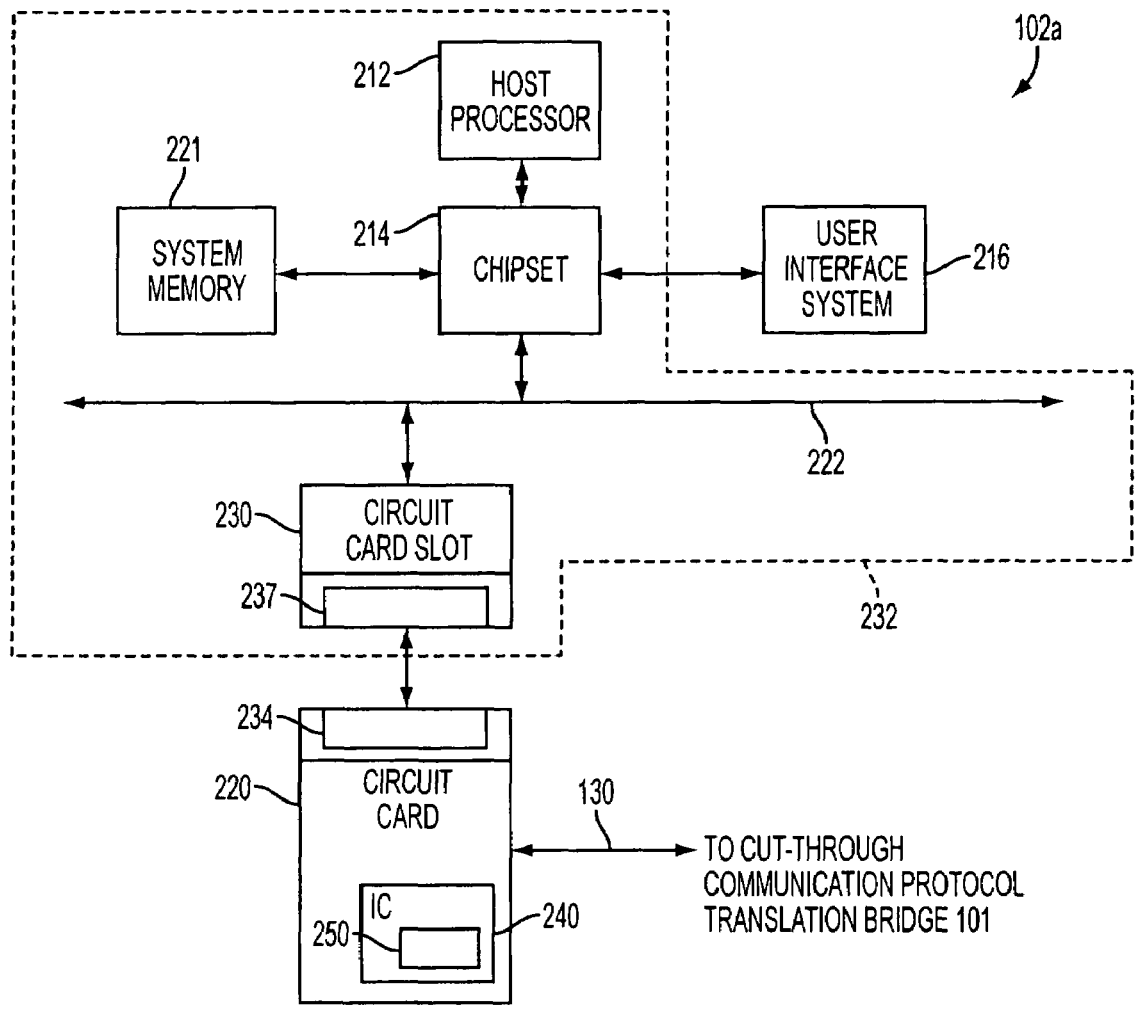
FIG. 2 is a diagram illustrating in greater detail a device in the system embodiment of FIG. 1.

FIG. 2 illustrates an embodiment 102a of the initiator device 102 of the system of FIG. 1. The initiator device 102a may include a computer node having a HBA, e.g., circuit card 220. The circuit card 220 may be capable of bidirectional communication with any of the target devices 114, 116 via the cut-through communication protocol translation bridge 101. The HBA 220 may act as a transmitting and receiving device that transmits and receives data and/or commands from other target devices via the bridge 101. The HBA 220 may have protocol engine circuitry 250 to facilitate such communication. The protocol engine circuitry 250 may exchange data and commands with other devices by transmission and reception of one or more frames. The protocol engine circuitry 250 may be included in an integrated circuit (IC) 240. As used herein, an "integrated circuit" or IC means a semiconductor device and/or microelectronic device, such as, for example, a semiconductor integrated circuit chip. Target devices may also have such protocol engine circuitry. Also as used herein, "circuitry" may comprise, for example, singly or in any combination, hardwired circuitry, programmable circuitry, state machine circuitry, and/or firmware that stores instructions executed by programmable circuitry.

The device 102a may include a host processor 212, a bus 222, a user interface system 216, a chipset 214, system memory 221, a circuit card slot 230, and a circuit card 220. The host processor 212 may include one or more processors known in the art such as an Intel® Pentium ® IV processor commercially available from the Assignee of the subject application. The bus 222 may include various bus types to transfer data and commands. For instance, the bus 222 may comply with the Peripheral Component Interconnect (PCI) Express™ Base Specification Revision 1.0, published Jul. 22, 2002, available from the PCI Special Interest Group, Portland, Oreg., U.S.A. (hereinafter referred to as a "PCI Express™ bus"). The bus 222 may alternatively comply with the PCI-X Specification Rev. 1.0a, Jul. 24, 2000, available from the aforesaid PCI Special Interest Group, Portland, Oreg., U.S.A. (hereinafter referred to as a "PCI-X bus").

The user interface system 216 may include one or more devices for a human user to input commands and/or data and/or to monitor the system, such as, for example, a keyboard, pointing device, and/or video display. The chipset 214 may include a host bridge/hub system (not shown) that couples the processor 212, system memory 221, and user interface system 216 to each other and to the bus 222. The chipset 214 may include one or more integrated circuit chips, such as those selected from integrated circuit chipsets commercially available from the Assignee of the subject application (e.g., graphics memory and I/O controller hub chipsets), although other integrated circuit chips may also, or alternatively be used. The processor 212, system memory 221, chipset 214, bus 222, and circuit card slot 230 may be on one circuit board 232 such as a system motherboard.

The circuit card 220 may be constructed to permit it to be inserted into the circuit card slot 230. When the circuit card 220 is properly inserted into the slot 230, connectors 234 and 237 become electrically and mechanically coupled to each other. When connectors 234 and 237 are so coupled to each other, the card 220 becomes electrically coupled to bus 222 and may exchange data and/or commands with system memory 221, host processor 212, and/or user interface system 216 via bus 222 and chipset 214.

Alternatively, without departing from this embodiment, the operative circuitry of the circuit card 220 may be included in other structures, systems, and/or devices. These other structures, systems, and/or devices may be, for example, in the motherboard 232, and coupled to the bus 222. These other structures, systems, and/or devices may also be, for example, comprised in chipset 214.

Figure 3:
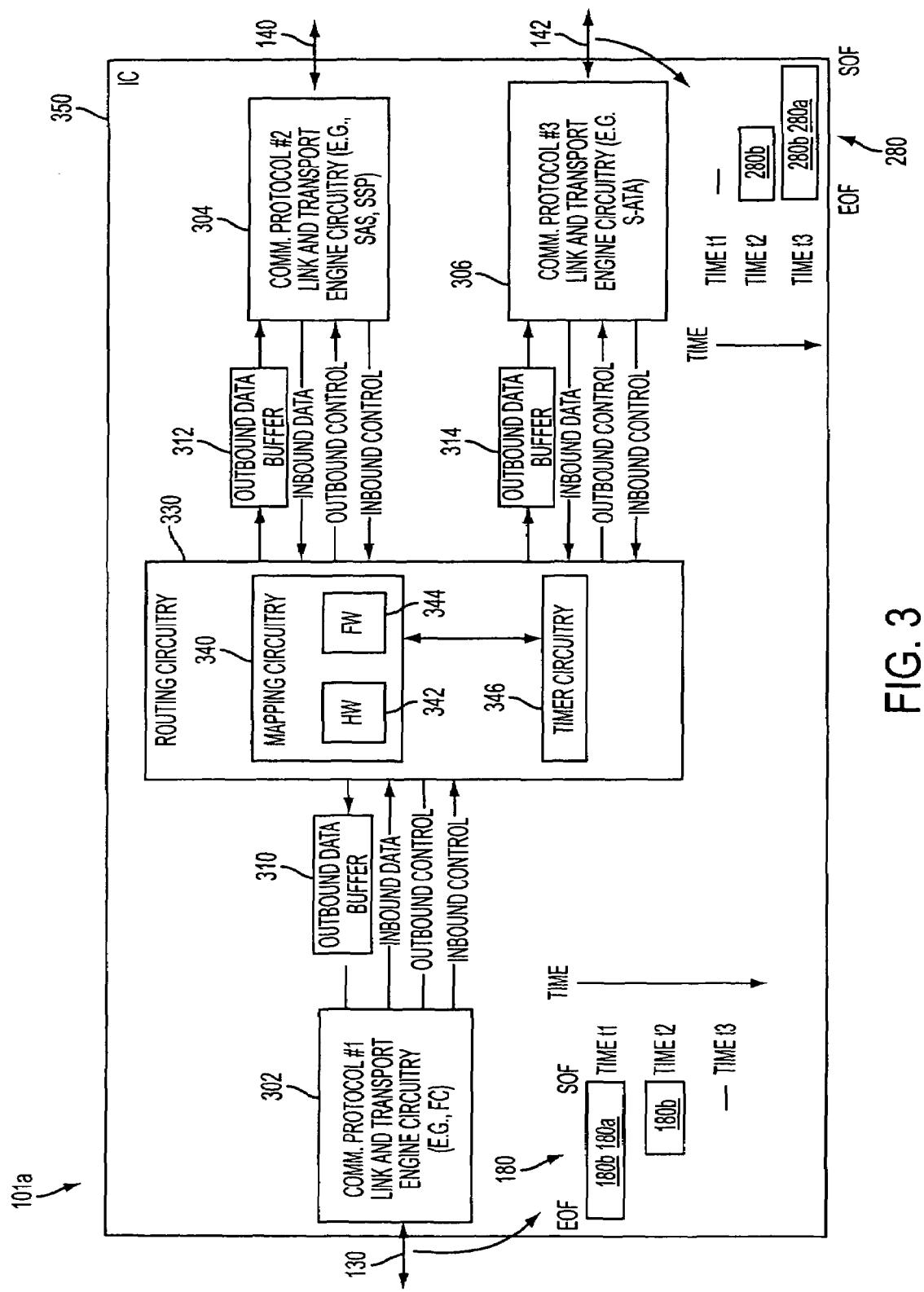
FIG. 3 is a diagram illustrating in greater detail an embodiment of the cut-through communication protocol translation bridge of FIG. 1.

FIG. 3 illustrates an embodiment 101 a of the cut-through communication protocol translation bridge 101 of the system of FIG. 1. The bridge 101 a may include link and transport engine circuitries 302, 304, 306 to facilitate communication of frames compliant with associated communication protocols. Circuitry 302 may comply with FC including the Fibre Channel Arbitrated Loop (FCAL) protocol for communicating via a communication link, e.g., link 130, compliant with the FC protocol. Circuitry 304 may comply with SAS including Serial Small Computer System Interface (SCSI) Protocol (SSP) for communicating via a communication link, e.g., link 140, compliant with SAS/SSP. Finally, circuitry 306 may comply with S-ATA including Serial Advanced Technology Attachment (S-ATA) Tunneled Protocol (STP) for communicating via a communication link, e.g., link 142, compliant with S-ATA/STP.

The layer and transport engine circuitries 302, 304, and 306 may be able to classify inbound frames as either inbound control or inbound data frames. As used herein, a "control frame" may include a frame containing control, status, and/or command information. As used herein, a "data frame" may include a frame containing any portion of user data. The circuitries 302, 304, and 306 may provide inbound control and data frames to routing circuitry 330 for routing outbound frames to the applicable receiving device(s), e.g., based on the destination address specified in the inbound frame.

The routing circuitry 330 may further comprise mapping circuitry 340 for translating portions of the inbound frame compliant with an inbound communication protocol into portions of an outbound frame compliant with an outbound communication protocol. The mapping circuitry 340 may perform upper layer protocol (ULP) mapping conversions. The mapping circuitry 340 may map various commands, control, and status indicators compliant with one inbound communication protocol into similar commands, control, and status indicators compliant with a second outbound communication protocol. Such command, control, and status indicators may include "Dwords." A "Dword" may contain four bytes of data which may include a group of one or more symbols representing control data to facilitate control of the transfer of information and/or to provide real time status information. For example, Dwords defining frame boundaries of a received frame compatible with a first communication protocol may be mapped into associated frame boundary Dwords compatible with a second communication protocol.

The mapping circuitry 340 may include hardware 342 and/or firmware 344. "Firmware", as used in any embodiment herein may, comprise circuitry capable of executing one or more instructions. The firmware 344 may be utilized to perform mapping operations for control frames, while the hardware 342, e.g., a state machine, may be utilized to perform mapping operations for data frames. For example, a control frame compliant with FC may include a "FCP_Xfer_Rdy" frame indicating that the receiving node currently has buffer space ready to receive data. The mapping circuitry 340 may map this "FCP_Xfer_Rdy" frame into a similar frame for SSP, e.g., the "SSP_Xfer_Rdy" frame and provide this SSP_Xfer_Rdy frame to circuitry 304 for transmission in an outbound control frame.

The mapping circuitry 340 may also map portions of a data frame compliant with one communication protocol into portions compliant with another communication protocol, and provide such translated portions to applicable circuitry 302, 304, 306 via an associated outbound buffer 310, 312, 314. The associated circuitry 302, 304, 306 may then accept the translated portions from the outbound buffer 310, 312, 314 and construct one or more outbound frames compliant with its respective communication protocol.

In operation, the cut-through communication protocol translation bridge 101 may receive an inbound frame 180 compliant with a first communication protocol, translate portions of the inbound frame into a translated portion compliant with a second communication protocol, and start constructing, and even sending, a second frame compliant with the second communication protocol before an entirety of the inbound frame is received.

For example, at time t1 an inbound frame 180 having portions 180b and 180a may be input via communication link 130 to the layer and transport engine circuitry 302 and may have a destination address specifying a destination device coupled to communication link 142. At time t2, portion 180a may have been received and translated by the mapping circuitry 340 into portion 280a compliant with a third communication protocol. Layer and transport engine circuitry 306 may also construct an outbound frame 280 and start sending that translated portion 280a in the outbound frame as additional data from the inbound frame 180 is still being received. At time t3, the entirety of the inbound frame 180 may have already been received. Portions 180a and 180b may have been translated into associated portions 280a and 280b, and layer and transport engine circuitry 306 may complete construction of the outbound frame 280 with translated portions 280a and 280b compliant with the third communication protocol.

Figure 4:
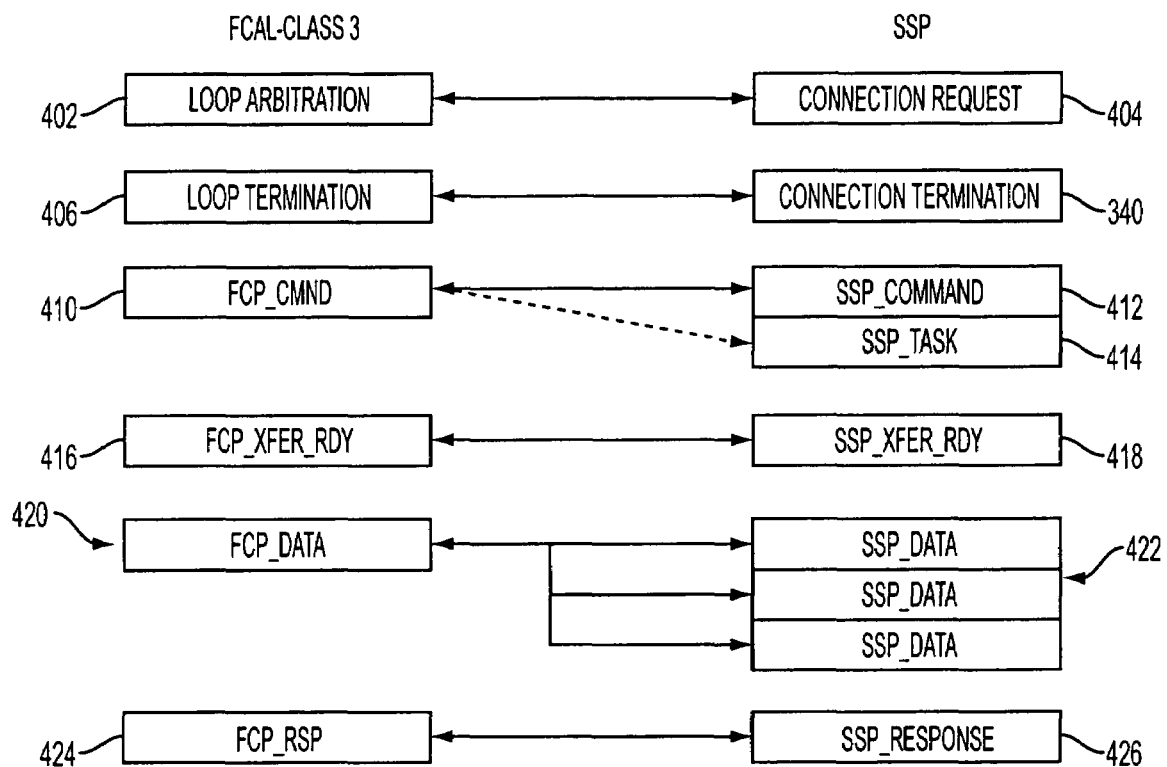
FIG. 4 is a diagram illustrating a mapping set for one set of communication protocols that may be performed by the cut-through communication protocol translation bridge of FIG. 3.

FIG. 4 illustrates exemplary mapping operations that may be performed by the mapping circuitry 340 when the inbound and/or outbound communication protocols to be mapped are compliant with FCAL and SAS/SSP. In general, command, control, status, and data compliant with one FCAL may be mapped into similar command, control, status, and data compliant with SSP. A loop arbitration command 402 compliant with FCAL may be mapped to a connection request command 404 compliant with SSP. A loop termination command 406 compliant with FC may be mapped to a connection termination command 408 compliant with SSP. A "FCP_CMND" 410 frame may be mapped to either an "SSP_Command" 412 or "SSP_Task" frame 414. A "FCP_Xfer_Rdy" frame 416 may be mapped to a "SSP_Xfer_Rdy" frame. Data (FCP_Data) 420 may be mapped to SSP_Data. Finally, an "FCP_RSP" frame 424 may be mapped to an equivalent "SSP_Response" frame 426.

Figure 5:
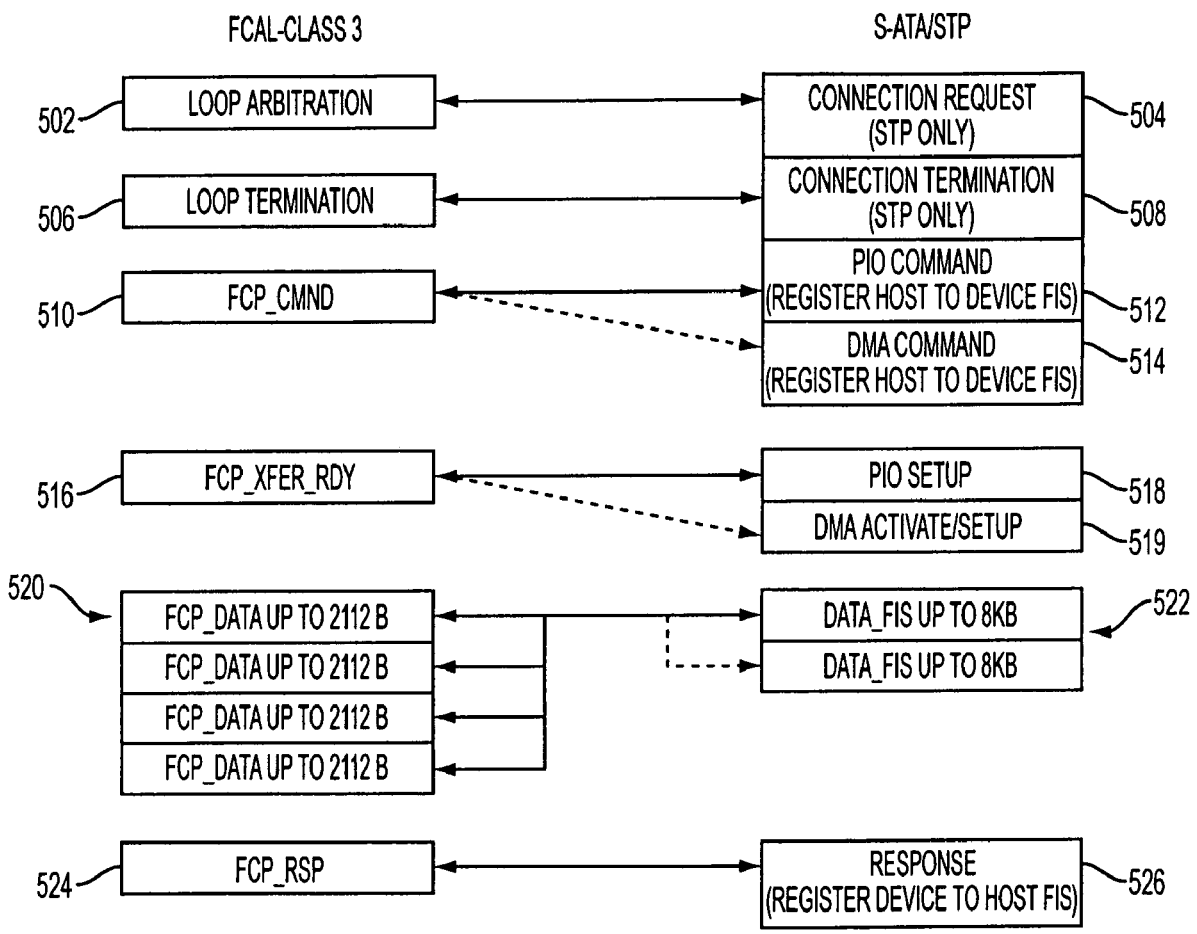
FIG. 5 is a diagram illustrating another mapping set for another set of communication protocols that may be performed by the cut-through communication protocol translation bridge of FIG. 3.

FIG. 5 illustrates additional exemplary mapping operations that may be performed by the mapping circuitry 340 when the inbound and/or outbound communication protocols to be mapped are FCAL and S-ATA/STP. In general, S-ATA/STP may use a programmed input/output (PIO) transport protocol and a direct memory access (DMA) transport protocol for data transfer. A loop arbitration command 502 compliant with FCAL may be mapped to a connection request command 504 compliant with STP. A loop termination command 506 compliant with FCAL may be mapped to a connection termination command 508 compliant with STP. A "FCP_CMND" 510 frame may be mapped to either programmed input/output (PIO) Command for a Register Host to Device Frame Information Structure (FIS) 512 or a direct memory access (DMA) Command for a Register Host to Device FIS 514. A "FCP_Xfer_Rdy" frame 516 may be mapped to a PIO Setup 518 or DMA Setup/DMA Activate 519. Data (FCP_Data) 520 may be mapped to a single or partial frame information structure (FIS) data 522. Finally, an "FCP_Response" frame 524 may be mapped to an equivalent "Response" frame 526.

As opposed to control frames, the size of data frames may vary considerably from one communication protocol to the next. For example, the maximum frame size for a data frame compliant with FC may be about 2,112 (or 2,048 bytes for most storage applications). The maximum frame size for a data frame compliant with SAS Serial Small Computer System Interface (SCSI) Protocol (SSP) may be about 1,024 bytes. Yet another maximum frame size for a data frame compliant with S-ATA may be about 8 kilobytes (KB).

Figure 6:
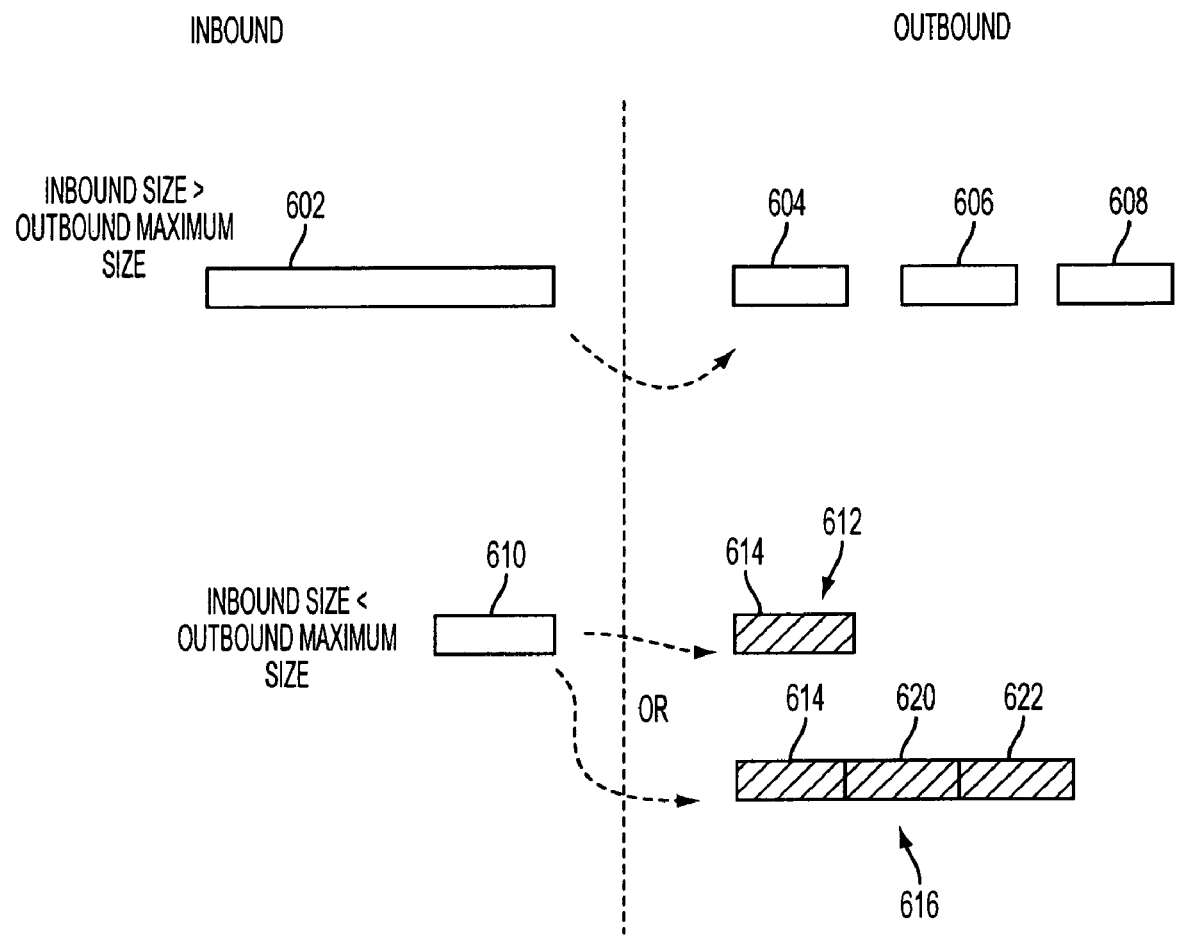
FIG. 6 is a diagram illustrating relative sizes of various inbound and outbound frames to the cut-through communication protocol translation bridge of FIG. 3.

FIG. 6 illustrates relative differences between inbound and outbound frame sizes and methods that may be utilized by the cut-through communication protocol translation bridge 101 to account for such size differences. If the inbound data frame size is larger than the outbound data frame size, data from the inbound frame may be mapped to one or more outbound frames as necessary to hold the entirety of the data from the inbound frame. For example, data from inbound frame 602 may be mapped into three separate outbound frames 604, 606, and 608. In another example, an inbound FC compliant frame having a size of 2,048 bytes may be mapped into two or more outbound SSP compliant frames each having a maximum size of 1,024 bytes. The inbound data frame may also, in some instances, need to be combined with data from a previous data frame for the same transmitting and receiving device combination, e.g., having the same IO tag.

If the inbound data frame size is less than the outbound frame size, the cut-through communication protocol translation bridge 101 may map the inbound frame from one inbound frame into one smaller sized outbound frame without waiting for any additional data from additional frames to enable it to utilize a larger outbound frame size permissible by the particular communication protocol. For example, data from inbound frame 610 when translated into data compliant with another communication protocol may fill portion 614 of a smaller sized frame 612 less than the maximum sized frame permissible by the particular communication protocol. Therefore, the utilization of the link will be reduced.

Alternatively, the translated data from the inbound frame may be temporarily stored, e.g., in an associated output buffer 310, 312, 314, as the associated link and transport engine circuitry 302, 304, 306 waits for additional data having the same IO tag so that it may fill a greater portion of a maximum sized outbound frame. Hence, link utilization will increase although latency may also be increased as the outbound frame waits for additional data before being transmitted. For example, outbound frame 616 may include translated data 614 from the first inbound frame 610 and translated data 620, 622 from other inbound frames having the same IO tag.

The cut-through communication protocol translation bridge 101 may further include timer circuitry 346 (see FIG. 3). The timer circuitry 346 may count for a time interval once data from a particular IO is temporarily stored in one of the buffers 310, 312, 314. Upon expiration of the time interval, the associated link and transport engine circuitry 302, 304, or 306 may transmit the outbound frame without waiting for additional translated data. This may also occur when the translated data in the buffer is the end of the IO data transfer.

The cut-through communication protocol translation bridge 101 may also provide for rapid retry requests after error detection. If an error occurred in an inbound frame, e.g., upon checking an error detection code such as the cyclic redundancy code (CRC) of the inbound frame, the bridge 101 may terminate the outbound frame with an abort type message and/or an error response status message and then terminate the inbound IO with an error response status message. If an error occurred in an outbound frame, the bridge 101 may perform a similar IO termination procedure. After an error is detected, a retry request may also be immediately sent. Therefore, compared to store and forward type architectures, retry requests may be sent sooner without waiting for the entire inbound IO to be processed.

Figure 7:
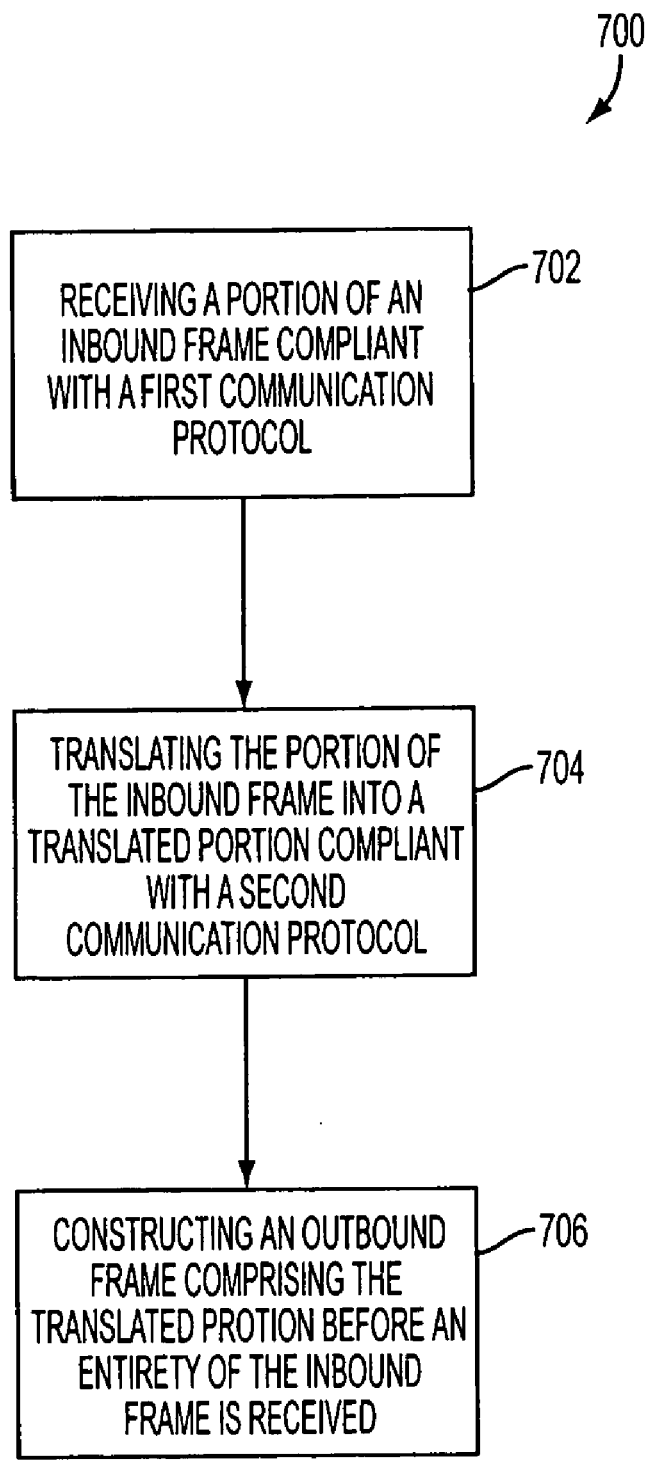
FIG. 7 is a flow chart illustrating operations according to an embodiment.

FIG. 7 is a flow chart of exemplary operations 700 consistent with an embodiment. Operation 702 may comprise receiving a portion of an inbound frame compliant with a first communication protocol. Operation 704 may comprise translating the portion of the inbound frame into a translated portion compliant with a second communication protocol. Finally, operation 706 may comprise constructing an outbound frame comprising the translated portion before an entirety of the inbound frame is received.

It will be appreciated that the functionality described for all the embodiments described herein may be implemented using hardware, firmware, software, or a combination thereof. An exemplary machine to execute instructions may, in one embodiment, be the IC 350.

Thus, in summary, one embodiment may comprise a cut-through communication protocol translation bridge. The bridge may comprise an integrated circuit capable of receiving a portion of a inbound frame compliant with a first communication protocol. The integrated circuit may also be capable of translating the portion of the inbound frame into a translated portion compliant with a second communication protocol. The integrated circuit may also be capable of constructing an outbound frame comprising the translated portion before an entirety of the first frame is received.

Another embodiment may comprise an article. The article may comprise a machine readable medium having stored thereon instructions that when executed by a machine result in the machine performing operations comprising: receiving a portion of an inbound frame compliant with a first communication protocol; translating the portion of said inbound frame into a translated portion compliant with a second communication protocol; and constructing an outbound frame comprising the translated portion before an entirety of the inbound frame is received.

In summary, another embodiment may comprise a system. The system may comprise an initiator device comprising a circuit card and a bus, the circuit card capable of being coupled to the bus; a target device; and a bridge. The bridge may comprise a port coupled to the at least one initiator device via a first communication link, the circuit card of the initiator device capable of communicating information via the first communication link compliant with a first communication protocol to the bridge. The bridge may further comprise a port coupled to the target device via a second communication link, and an integrated circuit capable of receiving a portion of a first frame compliant with the first communication protocol from the initiator device. The integrated circuit may also being capable of receiving a portion of an inbound frame compliant with the first communication protocol from the initiator device. The integrated circuit may also be capable of translating the portion of the inbound frame into a translated portion compliant with a second communication protocol. The integrated circuit may also be capable of constructing an outbound frame comprising the translated portion before an entirety of the inbound frame is received at said bridge.

Advantageously, the cut-through communication protocol translation bridge 101 may improve latency compared to a conventional store and forward type architecture since the bridge does not have to store an entire inbound frame before translating the inbound frame. The improved latency may enable initiator devices capable of communicating using one communication protocol, e.g., FC, to efficiently communicate with storage devices compliant with SAS and S-ATA. This effectively gives a FC initiator device the ability to efficiently use relatively inexpensive SAS and S-ATA storage devices.

In addition, the cut-through communication protocol translation bridge may require less memory resources compared to the conventional store and forward type architecture. Furthermore, the cut-through communication protocol translation bridge may also provide for rapid retry requests after error detection in either inbound or outbound frames compared to store and forward type architectures that would have to wait for completion of the store and forward process before sending a retry request.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A method comprising:
receiving a portion of an inbound frame compliant with a first communication protocol;
translating said portion of said inbound frame into a translated portion compliant with a second communication protocol; and
constructing an outbound frame comprising said translated portion before an entirety of said inbound frame is received;
wherein said inbound frame has a first size and said outbound frame has a second size, said first size greater than said second size, and said constructing operation comprises constructing said outbound frame and at least one additional outbound frame to hold a translated entirety of said inbound frame.

2. The method of claim 1, further comprising transmitting said translated portion of said outbound frame before said entirety of said inbound frame is received.

3. The method of claim 1, wherein said first communication protocol comprises a Fibre Channel protocol and said second communication protocol comprises a Serial Attached Small Computer Systems Interface (SAS) protocol.

4. The method of claim 1, wherein said first communication protocol comprises a Fibre Channel protocol and said second communication protocol comprises a Serial Advanced Technology Attachment (S-ATA) protocol.

5. A cut-through communication protocol translation bridge comprising:
an integrated circuit capable of receiving a portion of an inbound frame compliant with a first communication protocol, said integrated circuit also being capable of translating a portion of said inbound frame into a translated portion compliant with a second communication protocol, and said integrated circuit also be capable of constructing an outbound frame comprising said translated portion before an entirety of said first frame is received;
wherein said inbound frame has a first size and said outbound frame has a second size, said first size less than said second size, and said constructing operation comprises constructing said outbound frame comprising a translated entirety of said inbound frame and at least a portion of translated data of a portion of another inbound frame.

6. The bridge of claim 5, said integrated circuit also being capable of transmitting said translated portion of said outbound frame before said entirety of said inbound frame is received.

7. The bridge of claim 5, wherein said first communication protocol comprises a Fibre Channel protocol and said second communication protocol comprises a Serial Attached Small Computer Systems Interface (SAS) protocol.

8. The bridge of claim 5, wherein said first communication protocol comprises a Fibre Channel protocol and said second communication protocol comprises a Serial Advanced Technology Attachment (S-ATA) protocol.

9. An article comprising:
a machine readable medium having stored thereon instructions that when executed by a machine result in the machine performing operations comprising:
receiving a portion of an inbound frame compliant with a first communication protocol;
translating said portion of said inbound frame into a translated portion compliant with a second communication protocol;
constructing an outbound frame comprising said translated portion before an entirety of said inbound frame is received; and
wherein said inbound frame has a first size and said outbound frame has a second size, said first size less than said second size, and said constructing operation comprises constructing said outbound frame comprising a translated entirety of said inbound frame and at least a portion of translated data of a portion of another inbound frame.

10. The article of claim 9, wherein said operations further comprise transmitting said translated portion of said outbound frame before said entirety of said inbound frame is received.

11. The article of claim 9, wherein said first communication protocol comprises a Fibre Channel protocol and said second communication protocol comprises a Serial Attached Small Computer Systems Interface (SAS) protocol.

12. The article of claim 9, wherein said first communication protocol comprises a Fibre Channel protocol and said second communication protocol comprises a Serial Advanced Technology Attachment (S-ATA) protocol.

13. A system comprising:
an initiator device comprising a circuit card and a bus, said circuit card capable of being coupled to said bus;
a target device; and
a bridge comprising a port coupled to said at least one initiator device via a first communication link, said circuit card of said initiator device capable of communicating information via said first communication link compliant with a first communication protocol to said bridge, said bridge further comprising a port coupled to said target device via a second communication link, and said bridge further comprising an integrated circuit capable of receiving a portion of an inbound frame compliant with said first communication protocol from said initiator device, said integrated circuit also being capable of translating said portion of said inbound frame into a translated portion compliant with a second communication protocol, and said integrated circuit also be capable of constructing an outbound frame comprising said translated portion before an entirety of said inbound frame is received at said bridge;
wherein said inbound frame has a first size and said outbound frame has a second size, said first size greater than said second size, and said constructing operation comprises constructing said outbound frame and at least one additional outbound frame to hold a translated entirety of said inbound frame.

14. The system of claim 13, said integrated circuit also being capable of transmitting said translated portion of said outbound frame via said second communication link to said target device before said entirety of said inbound frame is received at said bridge.

15. The system of claim 13, wherein said first communication protocol comprises a Fibre Channel protocol and said second communication protocol comprises a Serial Attached Small Computer Systems Interface (SAS) protocol.

16. The system of claim 13, wherein said first communication protocol comprises a Fibre Channel protocol and said second communication protocol comprises a Serial Advanced Technology Attachment (S-ATA) protocol.

17. The system of claim 13, further comprising another target device capable of communicating using a third communication protocol, and said bridge comprises another port coupled to said another target device via a third communication link, said integrated circuit also being capable of translating said portion of said inbound frame into a translated portion compliant with said third communication protocol, and said integrated circuit also be capable of constructing a third frame comprising said translated portion compliant with said third communication protocol for communication to said another target device via said third communication link before an entirety of said inbound frame is received at said bridge.

* * * * *